(12) United States Patent
Wang et al.

(10) Patent No.: US 10,883,741 B2
(45) Date of Patent: Jan. 5, 2021

(54) DEHUMIDIFICATION DEVICE WITH ENHANCED DEHUMIDIFICATION EFFECT

(71) Applicant: NATIONAL CHIAO TUNG UNIVERSITY, Hsinchu (TW)

(72) Inventors: Chi-Chuan Wang, Hsinchu County (TW); Chuang-Hui Chiu, Tainan (TW)

(73) Assignee: National Chiao Tung Unviersity, Hsinchu (TW)

( * ) Notice: Subject to any disclaimer, the term of this patent is extended or adjusted under 35 U.S.C. 154(b) by 196 days.

(21) Appl. No.: 15/921,901

(22) Filed: Mar. 15, 2018

(65) Prior Publication Data

US 2018/0266724 A1   Sep. 20, 2018

(30) Foreign Application Priority Data

Mar. 16, 2017   (TW) .............................. 106108646 A

(51) Int. Cl.
  *F24F 3/14*    (2006.01)
  *F24F 13/30*   (2006.01)
  (Continued)

(52) U.S. Cl.
  CPC .............. *F24F 13/30* (2013.01); *B29C 45/66* (2013.01); *F24F 3/14* (2013.01); *F24F 3/153* (2013.01);
  (Continued)

(58) Field of Classification Search
  CPC ........ F24F 2003/1446; F24F 3/02; F24F 3/04; F24F 3/06; F24F 3/065; F24F 3/08;
  (Continued)

(56) References Cited

U.S. PATENT DOCUMENTS

2008/0104974 A1\* 5/2008 Dieckmann ............. F24F 3/153
  62/93
2009/0241564 A1\* 10/2009 Kinkel .................... F24F 3/153
  62/93
  (Continued)

FOREIGN PATENT DOCUMENTS

CN       101173830 A      5/2008
CN       105143808 A     12/2015
  (Continued)

*Primary Examiner* — David J Teitelbaum
(74) *Attorney, Agent, or Firm* — Rosenberg, Klein & Lee

(57) ABSTRACT

A dehumidification device with enhanced dehumidification effect includes a gas cooler receiving a first air gas and condensing the first air gas into a first condensing gas and a first condensing liquid. A heat exchanger has an inlet and an outlet. The first condensing gas flows from the gas cooler to a periphery of the heat exchanger to cool the heat exchanger. The inlet receives a second air gas from outside. The second air gas is condensed into a second condensing gas and a second condensing liquid using the cooled heat exchanger, and the second condensing gas and the second condensing liquid are expelled from the outlet. A gas heater receives the first condensing gas flowing through the periphery of the heat exchanger and the second condensing gas expelled from the outlet, and heats and turns them into dry air, and the gas heater expels the dry air.

13 Claims, 7 Drawing Sheets

(51) Int. Cl.
*B29C 45/66* (2006.01)
*F28F 1/02* (2006.01)
*F28F 21/06* (2006.01)
*F28B 1/06* (2006.01)
*F28D 1/053* (2006.01)
*F28F 17/00* (2006.01)
*F24F 3/153* (2006.01)

(52) U.S. Cl.
CPC ............ *F28B 1/06* (2013.01); *F28D 1/05316* (2013.01); *F28F 1/02* (2013.01); *F28F 17/005* (2013.01); *F28F 21/062* (2013.01); *F24F 2003/1446* (2013.01); *F28F 2210/08* (2013.01)

(58) Field of Classification Search
CPC ........ F24F 3/10; F24F 2003/144; F24F 3/147; F24F 1/0083; F24F 1/007; F24F 13/30; F24F 3/14; F25B 2313/0212; F28F 1/02; F28F 21/062
See application file for complete search history.

(56) References Cited

U.S. PATENT DOCUMENTS

| | | | | |
|---|---|---|---|---|
| 2011/0120685 A1* | 5/2011 | Van Heeswijk | ..... | B01D 53/265 165/170 |
| 2013/0091817 A1* | 4/2013 | Richard | ................ | B01D 45/06 55/467.1 |

FOREIGN PATENT DOCUMENTS

| | | |
|---|---|---|
| CN | 205957355 U | 2/2017 |
| DE | 2907310 A1 | 9/1979 |
| JP | 3649196 B2 | 5/2005 |

* cited by examiner

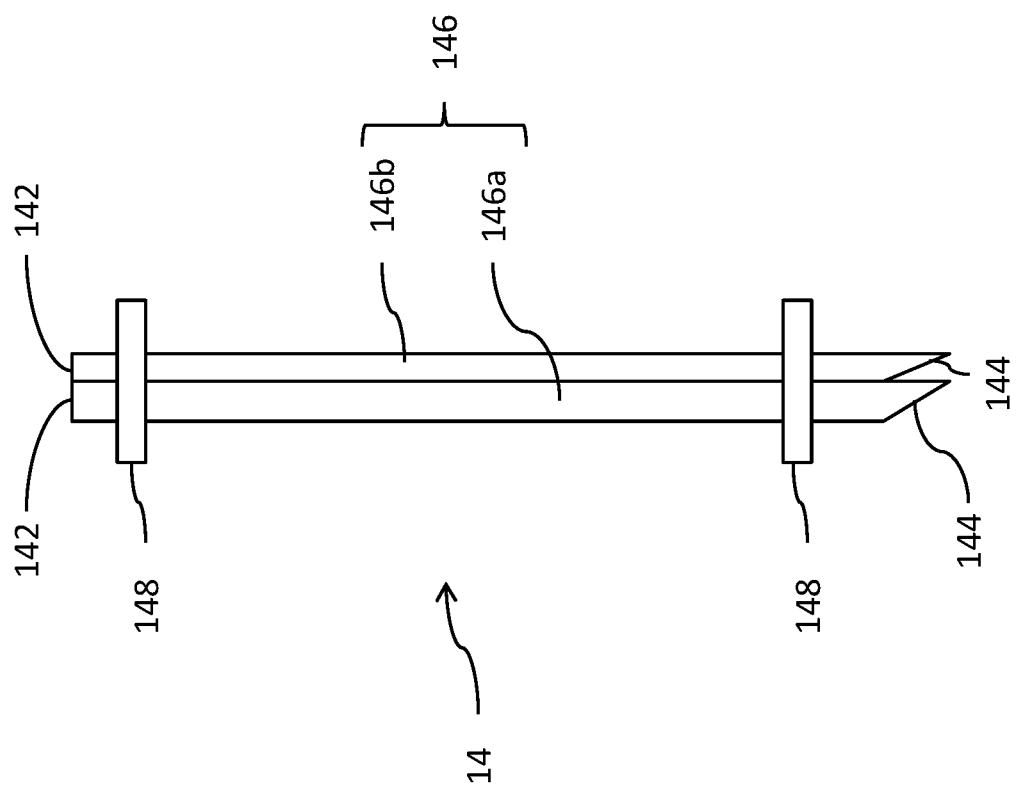

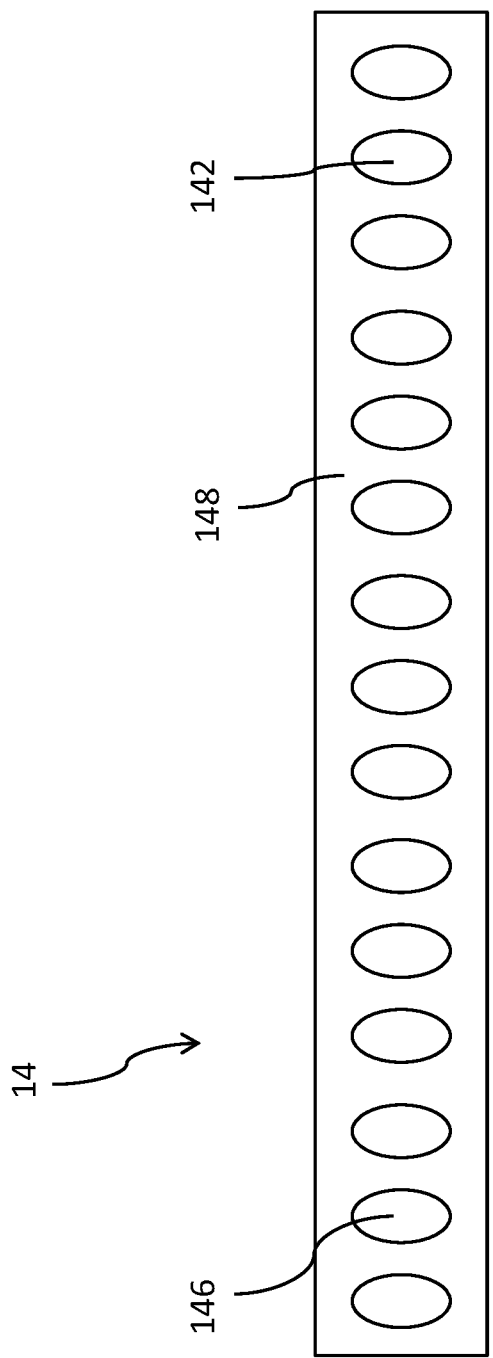

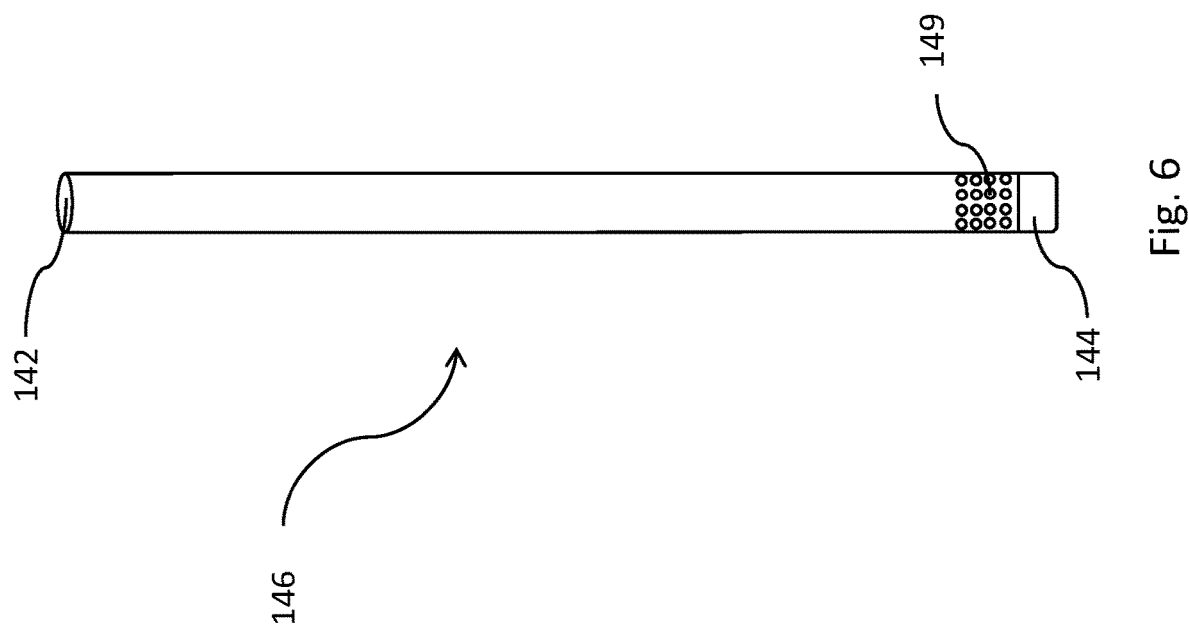

DEHUMIDIFICATION DEVICE WITH ENHANCED DEHUMIDIFICATION EFFECT

This application claims priority for Taiwan patent application no. 106108646 filed on Mar. 16, 2017, the content of which is incorporated by reference in its entirety.

BACKGROUND OF THE INVENTION

Field of the Invention

The present invention relates to a dehumidification device, particularly to a dehumidification device with enhanced dehumidification effect.

Description of the Related Art

In general, methods for reducing air humidity used by a dehumidifier include compression, refrigeration, liquid sorption and solid sorption. The dehumidifier is used in a humid environment. For example, Taiwan is located in the subtropical zone. In Taiwan, the dew point temperature is not lower than 0° C. all year. Operating at below the dew point temperature, the dehumidifier uses a compressor during a freeze cycle to achieve the better dehumidification effect lest evaporative coils freeze.

For the improved properties of the dehumidifier, experts apply frequency conversion of air conditioners to the dehumidifier. The frequency conversion changes the fact that the compressor only has ON and OFF states. The compressor of the air conditioner operates at a high frequency when starting. When reaching a predetermined temperature, the compressor operates at a low frequency to save energy. However, the dehumidifier is unlike the air conditioner that decreases the operation frequency of the compressor to reduce power consumption when reaching a predetermined temperature. The dehumidifier is not required to most greatly dehumidify environment air. Thus, controlling an operation type of the compressor is not the importance of the dehumidifier. Besides, the frequency-conversion module and the compressor have very expensive cost. The paid cost is not proportional to the saved power consumption. As a result, some dehumidification technologies are used to improve fans. The fans with high efficiency are used to improve the properties of the dehumidifier. However, the compressor of the dehumidifier occupies 90% of total power consumption, and the fans occupy less than 10% of total power consumption. Some dehumidification technologies use thermalsyphon heat pipes as heat exchangers, and install the heat exchangers in a dehumidifier. There are two heat pipes respectively arranged at front and back ends of an evaporator of the dehumidifier. An evaporation section of the heat pipe is arranged in front of cooling coils, and a condensing section of the heat pipe is arranged in back of the cooling coils. Thus, humid air is precooled before entering into the evaporator of the dehumidifier. Heat is preheated before entering into a reheater to reduce the loads of the evaporator and increase dehumidification capacities. Nevertheless, this way increases the installation cost. In addition, a volume of the dehumidifier is not designed to be too large whereby an internal space of the dehumidifier is limited. Consequently, it is very difficult to install the heat pipes in the dehumidifier. Hence, this design rearranges condensers or evaporators in the dehumidifier or decreases their amount to install the heat exchangers, thereby increasing friction pressure drops of pipes and decreasing the overall wind amount.

To overcome the abovementioned problems, the present invention provides a dehumidification device with enhanced dehumidification effect, so as to solve the afore-mentioned problems of the prior art.

SUMMARY OF THE INVENTION

The primary objective of the present invention is to provide a dehumidification device with enhanced dehumidification effect, which applies to a partial-bypass concept to a heat exchanger to produce a new dehumidification device that can improve the dehumidification effect for surroundings. The present invention has an energy-saving concept to achieve the dehumidification effect for a dehumidifier with high efficiency in a shorter time, and even achieves the better dehumidification effect than a general dehumidifier to provide a user with a more comfortable environment.

Another objective of the present invention is to provide a dehumidification device with enhanced dehumidification effect, which combines a heat exchanger with an evaporator and a condenser without greatly changing an existing dehumidifier structure. The heat exchanger can be massively produced by mold opening and injection molding to bring the low manufacture cost, thereby making the dehumidification device of the present invention more competitive than a dehumidifier with high efficiency, and bring many business chances.

To achieve the abovementioned objectives, the present invention provides a dehumidification device with enhanced dehumidification effect, which includes a gas cooler, a heat exchanger and a gas heater. The gas cooler receives a first air gas from outside and condenses the first air gas into a first condensing gas and a first condensing liquid. The heat exchanger is arranged at one side of the gas cooler, and the heat exchanger has at least one inlet and at least one outlet, and the first condensing gas flows from the gas cooler to a periphery of the heat exchanger to cool the heat exchanger, and the inlet receives a second air gas from the outside, and the second air gas is condensed into a second condensing gas and a second condensing liquid using the cooled heat exchanger, and the second condensing gas and the second condensing liquid are expelled from the outlet. The gas heater is arranged at one side of the heat exchanger, and the heat exchanger is arranged between the gas cooler and the gas heater, and the gas heater receives the first condensing gas flowing through the periphery of the heat exchanger and the second condensing gas expelled from the outlet of the heat exchanger, and heats and turns them into dry air, and the gas heater expels the dry air.

In an embodiment of the present invention, the heat exchanger further comprises at least one hollow tube having the inlet and the outlet, and the first condensing gas flows through a periphery of the hollow tube; and at least one fixing board arranged between the gas cooler and the gas heater and fixing the hollow tube.

Continuing from the abovementioned paragraph, there is a plurality of hollow tubes arranged abreast into a row and fixed in the fixing board. Alternatively, the plurality of hollow tubes is divided into a row of large-bore hollow tubes arranged abreast and a row of small-bore hollow tubes arranged abreast, and the row of the large-bore hollow tubes and the row of the small-bore hollow tubes are arranged from front to back and fixed in the fixing board. The outlet of the hollow tube is a tilted opening. The hollow tube is a circular hollow tube or an elliptical hollow tube. The periphery of the hollow tube further comprises a plurality of holes expelling the second condensing gas. The hollow tube is a flexible hollow tube.

In an embodiment of the present invention, the heat exchanger comprises plastic or metal tubes, and the gas cooler is an evaporator, and the gas heater is a condenser.

In an embodiment of the present invention, the dehumidification device further comprises a water collector receiving the first condensing liquid and the second condensing liquid.

Below, the embodiments are described in detail in cooperation with the drawings to make easily understood the technical contents, characteristics and accomplishments of the present invention.

BRIEF DESCRIPTION OF THE DRAWINGS

FIG. 4b is a side view of a heat exchanger according to the second embodiment of the present invention;

FIG. 5 is a top view of a heat exchanger according to the third embodiment of the present invention; and FIG. 6 is a front view of a heat exchanger according to the fourth embodiment of the present invention.

DETAILED DESCRIPTION OF THE INVENTION

In the market, a frozen dehumidifier achieves the better dehumidification efficiency than a rotary dehumidifier. In general, if the frozen dehumidifier intends to improve efficiency or increase dehumidification capacities, the solution is nothing more than enhancing a horsepower of a compressor or using the frequency-conversion technology with high cost. However, the solution can consume more power or greatly increase the manufacture cost of the dehumidifier. Thus, the present invention uses a heat exchanger with low cost and applies a partial bypass concept to a dehumidification device to increase the dehumidification efficiency and decrease the manufacture cost.

Figure 1:
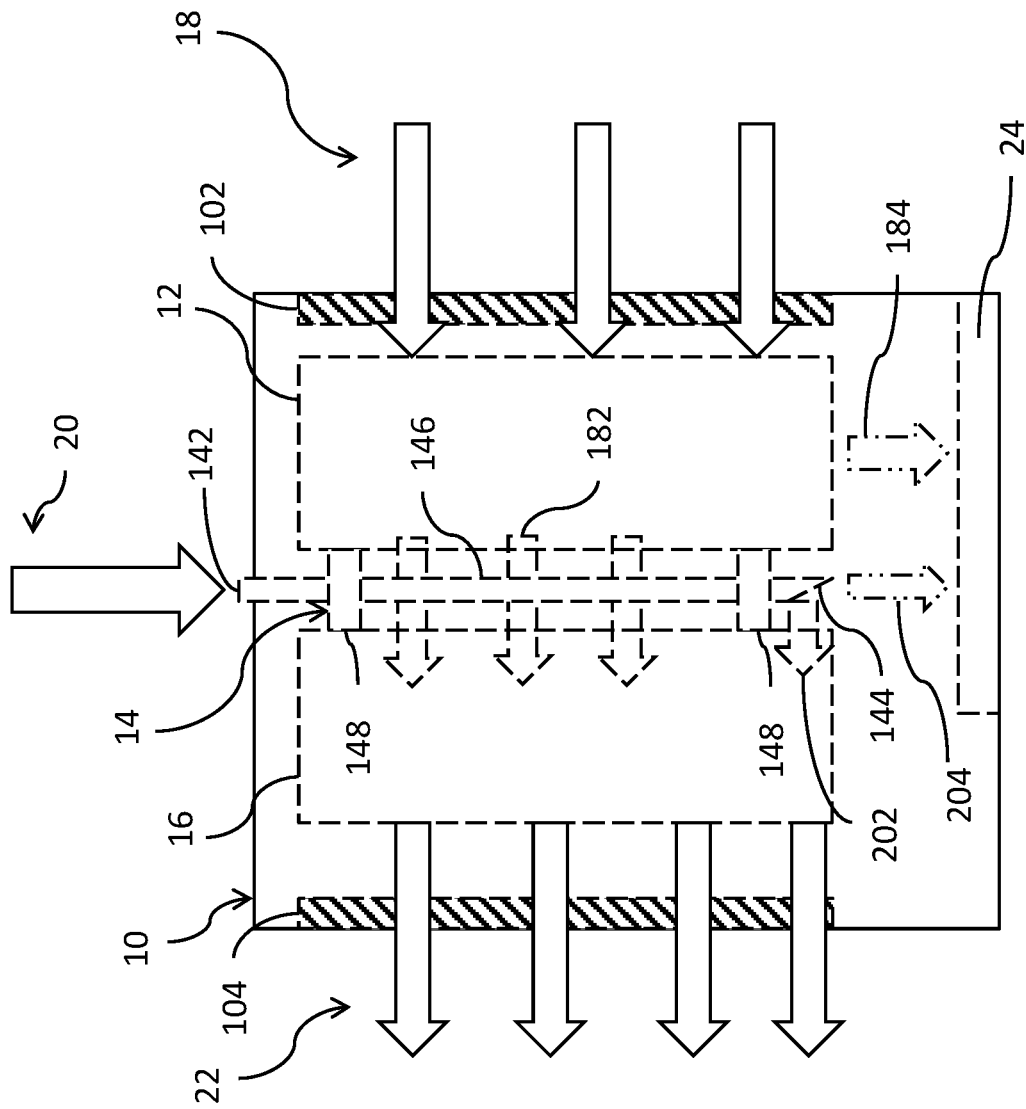
FIG. 1 is a diagram schematically showing an internal structure of a dehumidification device with enhanced dehumidification effect according to an embodiment of the present invention.

Refer to FIG. 1. A dehumidification device 10 with enhanced dehumidification effect comprises a gas cooler 12, a heat exchanger 14 and a gas heater 16. The heat exchanger 14 has at least one inlet 142 and at least one outlet 144. In the embodiment, the dehumidification device 10 is exemplified by a frozen dehumidifier. The gas cooler 12 is an evaporator of the frozen dehumidifier. The gas heater 16 is a condenser of the frozen dehumidifier. The heat exchanger 14 comprises plastic. The heat exchanger 14 is arranged at one side of the gas cooler 12. The gas heater 16 is arranged at one side of the heat exchanger 14. The heat exchanger 14 is arranged between the gas cooler 12 and the gas heater 16. The present invention does not limit the connection relationships among the gas cooler 12, the heat exchanger 14 and the gas heater 16, but limits the relative positions of the gas cooler 12, the heat exchanger 14 and the gas heater 16.

Figure 2:
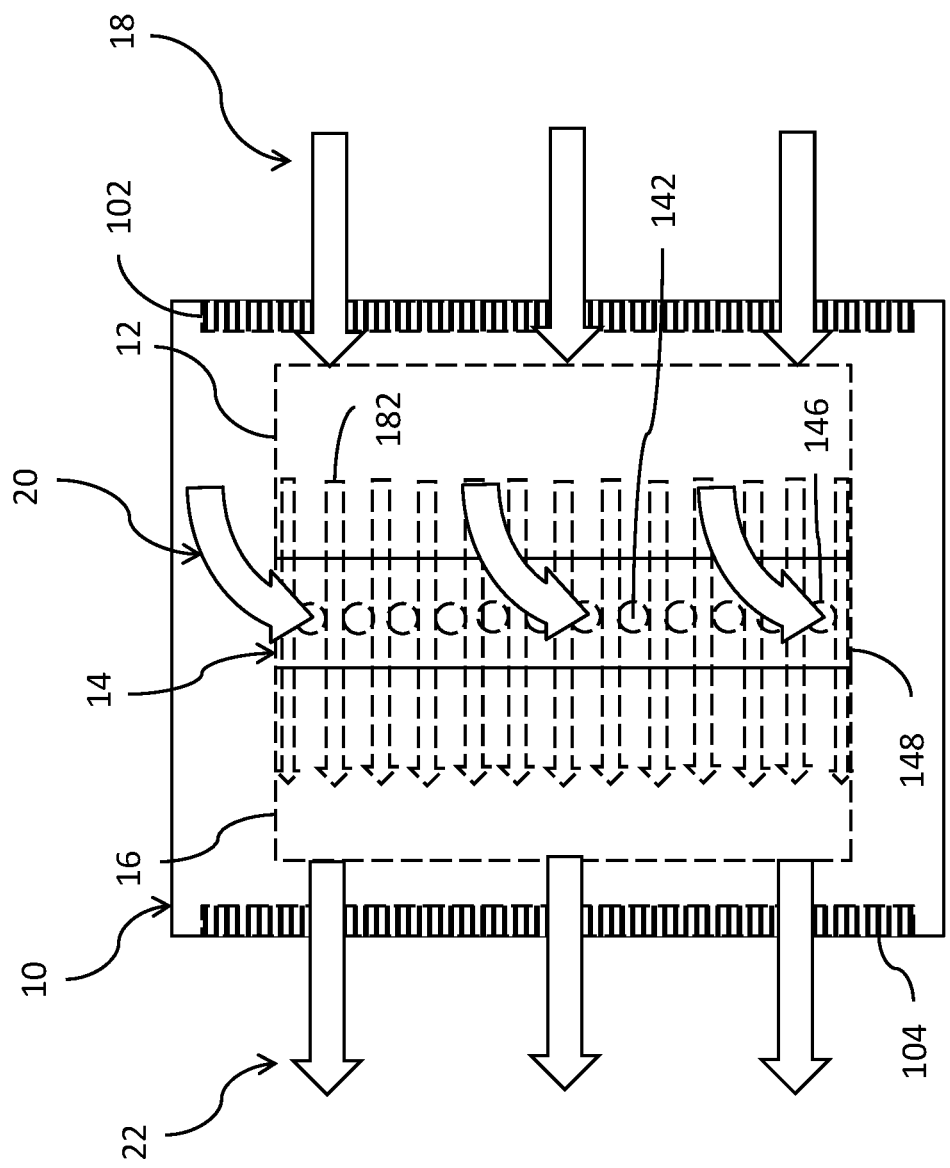
FIG. 2 is a top view of an internal structure of a dehumidification device with enhanced dehumidification effect according to an embodiment of the present invention.

After describing the elements of the present invention, the operation of the present invention is described. Refer to FIG. 1 and FIG. 2. The gas cooler 12 receives a first air gas 18 from outside and condenses the first air gas 18. When a temperature of the first air gas 18 reaches the dew point temperature, the first air gas 18 is condensed into a first condensing gas 182 and a first condensing liquid 184. Then, the first condensing gas 182 flows from the gas cooler 12 to a periphery of the heat exchanger 14 to cool the heat exchanger 14. In the embodiment, the heat exchanger 14 has a plurality of inlets 142 and a plurality of outlets 144. For example, there are twelve inlets 142 and twelve outlets 144. The inlets 142 receive a second air gas 20, and the cooled heat exchanger 14 cools the second air gas 20. Since the heat exchanger 14 has been cooled, a temperature of the second air gas 20 reaches the dew point temperature, so that the second air gas 20 is condensed into a second condensing gas 202 and a second condensing liquid 204. The second condensing gas 202 and the second condensing liquid 204 are expelled from the outlets 144. Finally, the gas heater 16 receives the first condensing gas 182 flowing through the periphery of the heat exchanger 14 and the second condensing gas 202 expelled from the outlets 144 of the heat exchanger 14, and heats and turns them into dry air 22 at a room temperature. The gas heater 16 expels the dry air 22 to an external environment through a gas outlet 104 of a case of the dehumidification device 10. There is a water collector 24 arranged under the heat exchanger 14 and the gas cooler 12. The water collector 24 is used to receive the first condensing liquid 184 and the second condensing liquid 204 from the gas cooler 12 and the outlets 144 of the heat exchanger 14.

Continuing from the abovementioned paragraph, the first air gas 18 and the second air gas 20 are defined by the positions that external air enters into the dehumidification device 10, and respectively flow in two different directions. For example, openings of the inlets 142 face upward, and the second air gas 20 is a gas over the dehumidification device 10. The gas cooler 12 uses its side to receive the first air gas 18 at a side of the dehumidification device 10. The present invention does not limit how to form the course of air. In general, a frozen dehumidifier is provided with fans therein. The fans are respectively arranged at sides of an evaporator and a condenser, absorb external air into an interior, dry the air and then expel it. In the embodiment, the dehumidification device 10 uses fans (not shown) to absorb external air into an interior of the dehumidification device 10. The present invention does not limit the positions and types of the fans. The present invention limits the facts that humid air flows from an exterior to the interior of the dehumidification device 10, and that the air is turned into dry air, and that the dry air is expelled.

Figure 3:
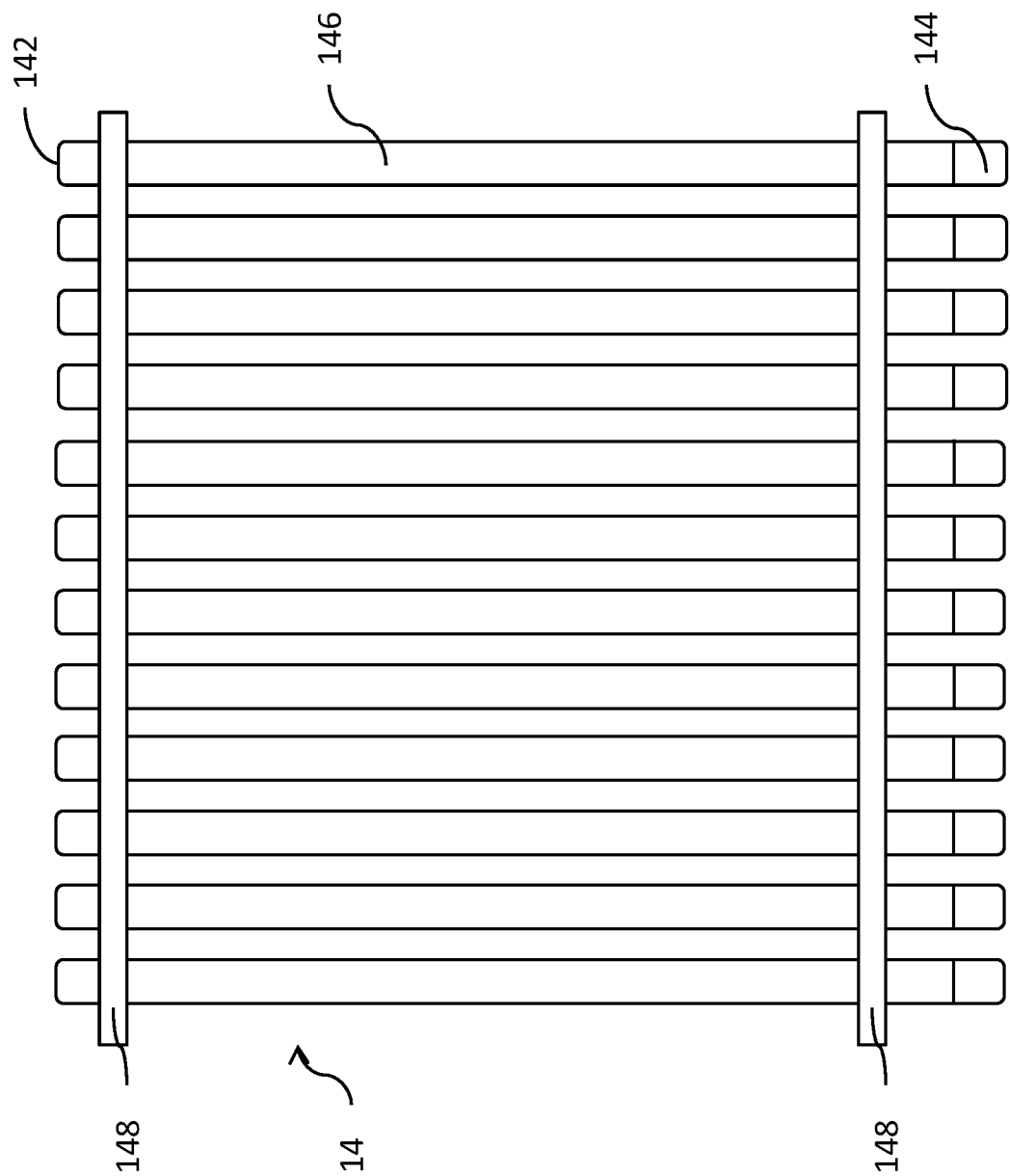
FIG. 3 is a front view of a heat exchanger according to the first embodiment of the present invention.

After describing the operation of the present invention, the present invention details the heat exchanger. Refer to FIG. 1, FIG. 2 and FIG. 3. The heat exchanger 14 further comprises at least one hollow tube 146 and at least one fixing board 148. In the embodiment, there are twelve hollow tubes 146. Each hollow tube 146 is a circular hollow tube. A bore and a length of the circular hollow tube are respectively 12 mm and 325 mm Besides, the present invention exemplifies two fixing boards 148. The hollow tubes 146 are arranged abreast into a row and fixed in the two fixing boards 148. The inlet 142 and the outlet 144 are respectively an upper opening and a lower opening of the hollow tube 146. The first condensing gas 182 flows from the gas cooler 12 to the gas heater 16 through peripheries of the hollow tubes 146. When the first condensing gas 182 flows through the hollow tubes 146, the temperature of the hollow tubes 146 is immediately decreased to cool the second air gas 20 coining from the inlets 142. The outlet 144 is a tilted opening that faces the gas heater 16 to help the second condensing gas 202 flow to the gas heater 16.

Figure 4A:
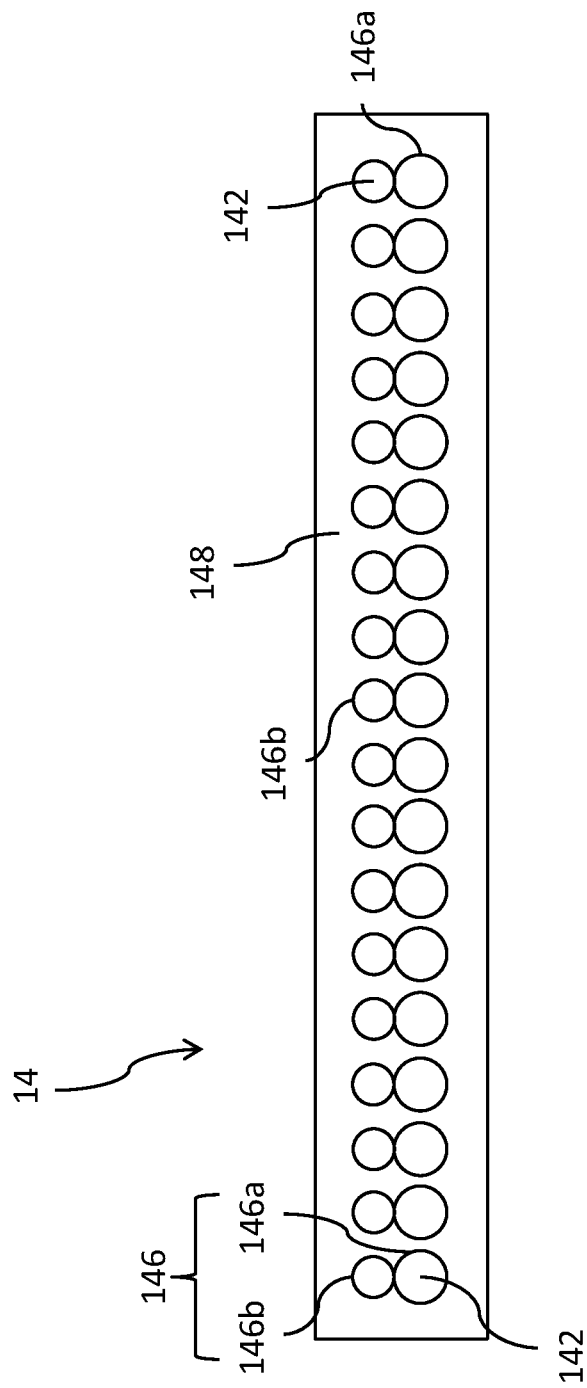
FIG. 4a is a top view of a heat exchanger according to the second embodiment of the present invention.

Furthermore, refer to FIG. 4a and FIG. 4b. The hollow tubes 146 are divided into a row of large-bore hollow tubes 146a arranged abreast and a row of small-bore hollow tubes 146b arranged abreast, and the row of the large-bore hollow tubes 146a and the row of the small-bore hollow tubes 146b are arranged from front to back and fixed in the two fixing boards 148. For example, there are eighteen large-bore hollow tubes 146a and eighteen small-bore hollow tubes 146b. The large-bore hollow tubes 146a respectively touch the small-bore hollow tubes 146b. In the embodiment, bores of the large-bore hollow tube 146a and the small-bore hollow tube 146b are respectively 8 mm and 6 mm, and lengths of the large-bore hollow tube 146a and the small-bore hollow tube 146b are 325 mm, but the present invention is not limited thereto. A user can design the large-bore hollow tube 146a and the small-bore hollow tube 146b having different lengths. A primary objective of the embodiment is to enhance the dehumidification effect of the dehumidification device, wherein the process of how to turn the humid air into the dry air have been described previously so will not be reiterated.

In addition, the hollow tube is not only a circular hollow tube but also an elliptical hollow tube. Refer to FIG. 5. For example, the fixing boards 148 fix fifteen hollow tubes 146 arranged abreast into a row, and these hollow tubes 146 are elliptical hollow tubes. According to experiments of the applicant of the present invention, the circular hollow tube, the elliptical hollow tube, the large-bore hollow tube and the small-bore hollow tube are the preferred embodiment of the present invention to achieve the better dehumidification effect for the dehumidification device.

Refer to FIG. 6. The peripheries of the hollow tubes 146 further comprise a plurality of holes 149. For example, the holes 149 are located near the outlets 144 to rapidly expel the second condensing gas 202.

On top of that, the hollow tube is alternatively a flexible hollow tube. When the flexible hollow tube is curved, the opening of its inlet faces toward the side of the dehumidification device. In this way, the position that external air enters can be changed. For example, when the dehumidification device is arranged on a ceiling, the opening of the hollow tube cannot face upward. Instead, the opening of the hollow tube faces toward the side of the dehumidification device.

The present invention uses the heat exchanger and the partially-bypass principle to increase the amount of air inlets, whereby a part of air flows the peripheries of the hollow tubes of the heat exchanger and a part of the air flows the insides of the hollow tubes, thereby increasing air quantity entering the dehumidification device. Additionally, the dry and cold air that has been cooled is used to decrease the temperature of the heat exchanger, and then the air coining from the other directions is dehumidified, thereby designing a dehumidification device with high performance.

As a result, the present invention only installs the heat exchanger between an evaporator and a condenser of a frozen dehumidifier but does not describe the other elements of the dehumidifier. The present invention does not need to greatly change an internal structure of the dehumidifier. An exterior of the dehumidifier is provided with openings according to the heat exchanger to increase entrances that external air enters into the dehumidifier. Besides, the user can decide the shape, arrangement or direction of the openings of the hollow tubes according to requirements. An amount of the hollow tubes is not limited. In addition to the plurality of hollow tubes, the user can design a hollow tube having a plurality of openings. Additionally, the hollow tubes are massively produced after mold opening. In the embodiment of the present invention, the hollow tube is a plastic hollow tube. Thus, using injection molding, the plastic hollow tubes are massively and rapidly produced to decrease the production cost and do not increase too much additional cost to the dehumidifier, whereby the present invention quite has competitiveness. In addition to the heat exchanger comprising plastic hollow tubes, the user can produce a heat exchanger made of other material such as metal tubes according to requirement. As long as the heat exchangers are conveniently produced and achieve the partially-bypass purpose, they have the same effect.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A dehumidification device with enhanced dehumidification effect comprising:
 a gas cooler receiving a first air gas from outside and condensing said first air gas into a first condensing gas and a first condensing liquid, wherein said gas cooler defines a first airflow path for said first air gas in a first direction, and said first air gas is condensed within said first airflow path;
 a heat exchanger arranged at one side of said gas cooler, wherein said heat exchanger has at least one inlet and at least one outlet, said first condensing gas flows from said gas cooler across a periphery of said heat exchanger to cool said heat exchanger, said at least one inlet receives a second air gas from outside, said heat exchanger defines a second airflow path for said second air gas in a second direction different from said first direction, said second airflow path crosses said first airflow path, said second air gas is condensed into a second condensing gas and a second condensing liquid by passage through said cooled heat exchanger for supplemental condensing of outside air, said second air gas is condensed within said second airflow path, and said second condensing gas and said second condensing liquid are expelled from said at least one outlet; and
 a gas heater arranged at one side of said heat exchanger, and said heat exchanger is thereby arranged between said gas cooler and said gas heater, wherein said gas heater receives and heats said first condensing gas flowing past said periphery of said heat exchanger and said second condensing gas expelled from said at least one outlet of said heat exchanger, said gas heater thereby generates dry air, and said gas heater expels said dry air.

2. A dehumidification device with enhanced dehumidification effect comprising:
 a gas cooler receiving a first air gas from outside and condensing said first air gas into a first condensing gas and a first condensing liquid;
 a heat exchanger arranged at one side of said gas cooler, wherein said heat exchanger has at least one inlet and at least one outlet, said first condensing gas flows from said gas cooler to a periphery of said heat exchanger to cool said heat exchanger, said at least one inlet receives a second air gas from said outside, said second air gas is condensed into a second condensing gas and a second condensing liquid using said cooled heat exchanger, and said second condensing gas and said second condensing liquid are expelled from said at least one outlet; and a gas heater arranged at one side of said heat exchanger, and said heat exchanger is thereby arranged between said gas cooler and said gas heater, wherein said gas heater receives and heats said first condensing gas flowing to said periphery of said heat exchanger and said second condensing gas expelled from said at least one outlet of said heat exchanger into dry air, and said gas heater expels said dry air;

wherein said heat exchanger further comprises:
- at least one hollow tube having said at least one inlet and said at least one outlet, and said first condensing gas flows through a periphery of said at least one hollow tube; and
- at least one fixing board arranged between said gas cooler and said gas heater and fixing said at least one hollow tube.

3. The dehumidification device with enhanced dehumidification effect according to claim 2, wherein said at least one hollow tube further comprises a plurality of hollow tubes arranged abreast into a row and fixed in said at least one fixing board.

4. The dehumidification device with enhanced dehumidification effect according to claim 2, wherein said at least one hollow tube further comprises a plurality of hollow tubes, and said plurality of hollow tubes is divided into a row of large-bore hollow tubes arranged abreast and a row of small-bore hollow tubes arranged abreast, and said row of said large-bore hollow tubes and said row of said small-bore hollow tubes are arranged from front to back and fixed in said at least one fixing board.

5. The dehumidification device with enhanced dehumidification effect according to claim 4, wherein said large-bore hollow tubes respectively touch said small-bore hollow tubes.

6. The dehumidification device with enhanced dehumidification effect according to claim 2, wherein said outlet of said at least one hollow tube is a tilted opening.

7. The dehumidification device with enhanced dehumidification effect according to claim 2, wherein said at least one hollow tube is a circular hollow tube or an elliptical hollow tube.

8. The dehumidification device with enhanced dehumidification effect according to claim 2, wherein said periphery of said at least one hollow tube further comprises a plurality of holes expelling said second condensing gas.

9. The dehumidification device with enhanced dehumidification effect according to claim 2, wherein said at least one hollow tube is a flexible hollow tube.

10. The dehumidification device with enhanced dehumidification effect according to claim 1, wherein said heat exchanger comprises plastic or metal tubes.

11. The dehumidification device with enhanced dehumidification effect according to claim 1, wherein said gas cooler is an evaporator, and said gas heater is a condenser.

12. The dehumidification device with enhanced dehumidification effect according to claim 1, wherein said inlet has an opening that faces upward or sideward.

13. The dehumidification device with enhanced dehumidification effect according to claim 1, further comprising a water collector arranged under said heat exchanger and said gas cooler and receiving said first condensing liquid and said second condensing liquid.

\* \* \* \* \*